(12) United States Patent
Sharma et al.

(10) Patent No.: US 7,836,352 B2
(45) Date of Patent: Nov. 16, 2010

(54) METHOD AND APPARATUS FOR IMPROVING HIGH AVAILABILITY IN A PCI EXPRESS LINK THROUGH PREDICTIVE FAILURE ANALYSIS

(75) Inventors: Debendra Das Sharma, Santa Clara, CA (US); Surena Neshvad, Hillsboro, OR (US); Guru Rajamani, Sunnyvale, CA (US); Hanh Hoang, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1174 days.

(21) Appl. No.: 11/479,417

(22) Filed: Jun. 30, 2006

(65) Prior Publication Data

US 2008/0005706 A1    Jan. 3, 2008

(51) Int. Cl.
    *G06F 11/00*    (2006.01)
(52) U.S. Cl. .......................... 714/44; 714/43; 714/801; 714/704; 706/7
(58) Field of Classification Search ................... 714/44, 714/704, 801, 43; 716/4
    See application file for complete search history.

(56) References Cited

U.S. PATENT DOCUMENTS

| 6,690,650 | B1 * | 2/2004 | Stener | 370/241 |
|---|---|---|---|---|
| 7,010,607 | B1 * | 3/2006 | Bunton | 709/228 |
| 7,127,669 | B2 * | 10/2006 | Platenberg et al. | 714/820 |
| 7,137,018 | B2 * | 11/2006 | Gutman et al. | 713/323 |
| 7,188,263 | B1 * | 3/2007 | Rubinstein et al. | 713/300 |
| 7,320,084 | B2 * | 1/2008 | Steinmetz et al. | 714/4 |
| 7,353,443 | B2 * | 4/2008 | Sharma | 714/742 |
| 7,426,597 | B1 * | 9/2008 | Tsu et al. | 710/307 |
| 7,469,366 | B1 * | 12/2008 | Reed | 714/704 |
| 2002/0133762 | A1 * | 9/2002 | Susnow et al. | 714/704 |
| 2004/0047408 | A1 * | 3/2004 | Koenenkamp et al. | 375/224 |
| 2006/0123298 | A1 * | 6/2006 | Tseng | 714/733 |
| 2006/0179369 | A1 * | 8/2006 | Bravo et al. | 714/718 |
| 2006/0200708 | A1 * | 9/2006 | Gentieu et al. | 714/704 |
| 2006/0212775 | A1 * | 9/2006 | Cypher | 714/758 |
| 2007/0011549 | A1 * | 1/2007 | Sharma | 714/746 |
| 2007/0157054 | A1 * | 7/2007 | Frodsham et al. | 714/704 |
| 2008/0002590 | A1 * | 1/2008 | Thomas et al. | 370/242 |

* cited by examiner

*Primary Examiner*—Scott T. Baderman
*Assistant Examiner*—Loan Truong
(74) *Attorney, Agent, or Firm*—Blakely, Sokoloff, Taylor & Zafman LLP

(57) ABSTRACT

A method and apparatus is described herein for tracking errors for one of a plurality of lanes in a link, tracking errors for the link, and in the case of a root complex, tracking error correction messages. This information is used to determine the suitability for use of a lane and to determine if correction action is needed. In one embodiment, this method and apparatus is used with PCI Express interconnects.

17 Claims, 5 Drawing Sheets

Computer System 100
PRIOR ART

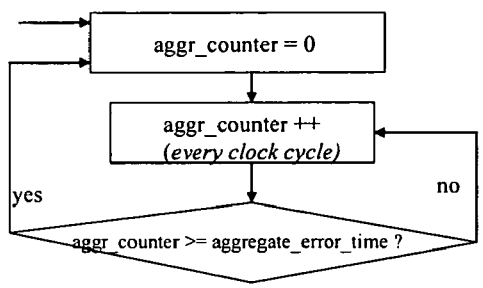
Figure 5 (aggregate counter)
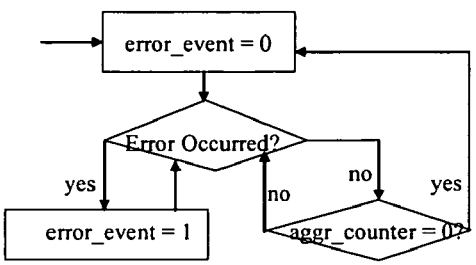
Figure 6 (error_event for each lane as well as type)
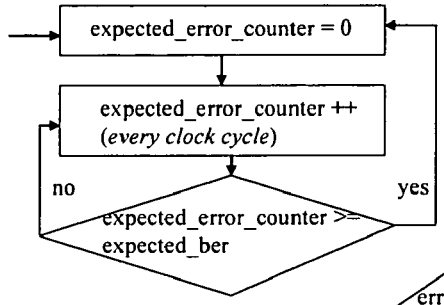
Figure 7 (expected error counter)
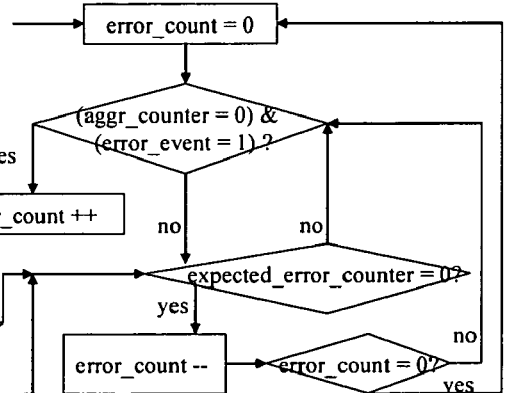
Figure 8 (error_count for each lane as well as type)

METHOD AND APPARATUS FOR IMPROVING HIGH AVAILABILITY IN A PCI EXPRESS LINK THROUGH PREDICTIVE FAILURE ANALYSIS

FIELD

Embodiments of the invention generally relate to the field of interconnect systems and, more particularly, to systems, methods and apparatuses for determining the suitability for use of a lane in an interconnect system.

BACKGROUND

The PCI Express (PCIE) Specification provides a set of advanced error reporting and error logging features to determine the type of error that occurs in a PCIE link. For more information, see PCI Express Base Specification, Revision 1.1 (http://www.pcisig.com/specifications/pciexpress/). The error reporting and logging features provide specific information about the type of error that occurred, such as receiver errors (e.g., 8b/10b errors), Data Link Layer Packet (DLLP) Cyclical Redundancy Checking (CRC) errors, Transaction Layer Packet (TLP) CRC errors, and Malformed TLP.

In the case of uncorrectable errors, such as Malformed TLP, the header information associated with the error is logged. This information can help diagnostic software to pinpoint the cause of the failure. For correctable errors, such as 8b/10b errors and CRC errors, no header information is logged. Most link failures arise from a link that becomes marginal over time or from connections that become loose. These issues manifest themselves as 8b/10b errors and if those go undetected, as TLP/DLLP CRC errors. In this case, the PCIE Specification does not provide any mechanism to identify the lane where the failure occurred. If a lane fails completely, the link will enter the Recovery state of the Link Training and Status State Machine (LTSSM) and eventually eliminate the faulty lane. However, for a marginal lane, there is no mechanism to identify the marginal lane. Thus, no corrective action can be taken and the link can only repeatedly attempt Recovery. If the recovery mechanism can correct the fault, then the link keeps operating. However, if the recovery mechanism cannot correct the fault, but the link successfully renegotiates, the link will eventually go down.

FIG. 1 illustrates one embodiment of a PCIE topology. Computer system 100 includes a root complex (RC) 120 and multiple endpoints 150 and 160. Root complex 120 denotes the root of an input/output (I/O) hierarchy that connects the microprocessor 110 and memory 130 subsystem to the I/O. As illustrated, root complex 120 supports one or more PCIE ports where each interface defines a separate hierarchy domain. Each hierarchy domain may be composed of a single endpoint, such as endpoint 150 and endpoint 160, or a sub-hierarchy containing a switch with multiple endpoints. Endpoint refers to a type of I/O device that can request or complete a transaction.

As used herein, the term upstream refers to a direction up the hierarchy of connection, e.g. towards root complex 120. Inversely, downstream, as used herein refers to a direction down the hierarchy of connection, e.g. away from root complex 120.

DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5 is a flow chart for an aggregate counter according to an embodiment of the invention.

FIG. 6 is a flow chart for the error_event according to an embodiment of the invention.

FIG. 7 is a flow chart for the expected error counter according to an embodiment of the invention.

FIG. 8 is a flow chart for the error_count according to an embodiment of the invention.

DETAILED DESCRIPTION

A method and apparatus is described herein for tracking errors for one of a plurality of lanes in a link, tracking errors for the link, and in the case of a root complex, tracking error correction messages. This information is used to determine the suitability for use of a lane and to determine if corrective action is needed, thus making the link more robust. Embodiments of the techniques described herein allow a link to become more robust when a faulty lane is identified and the component can eliminate the use of a lane or lanes that are susceptible to failure. In one embodiment, PCI Express (PCIE) interconnects are used to transfer information between components. The following description illustrates the techniques described herein using PCIE. However, it will be apparent to one skilled in the art that the techniques described herein can apply to other interconnect systems.

Figure 1:
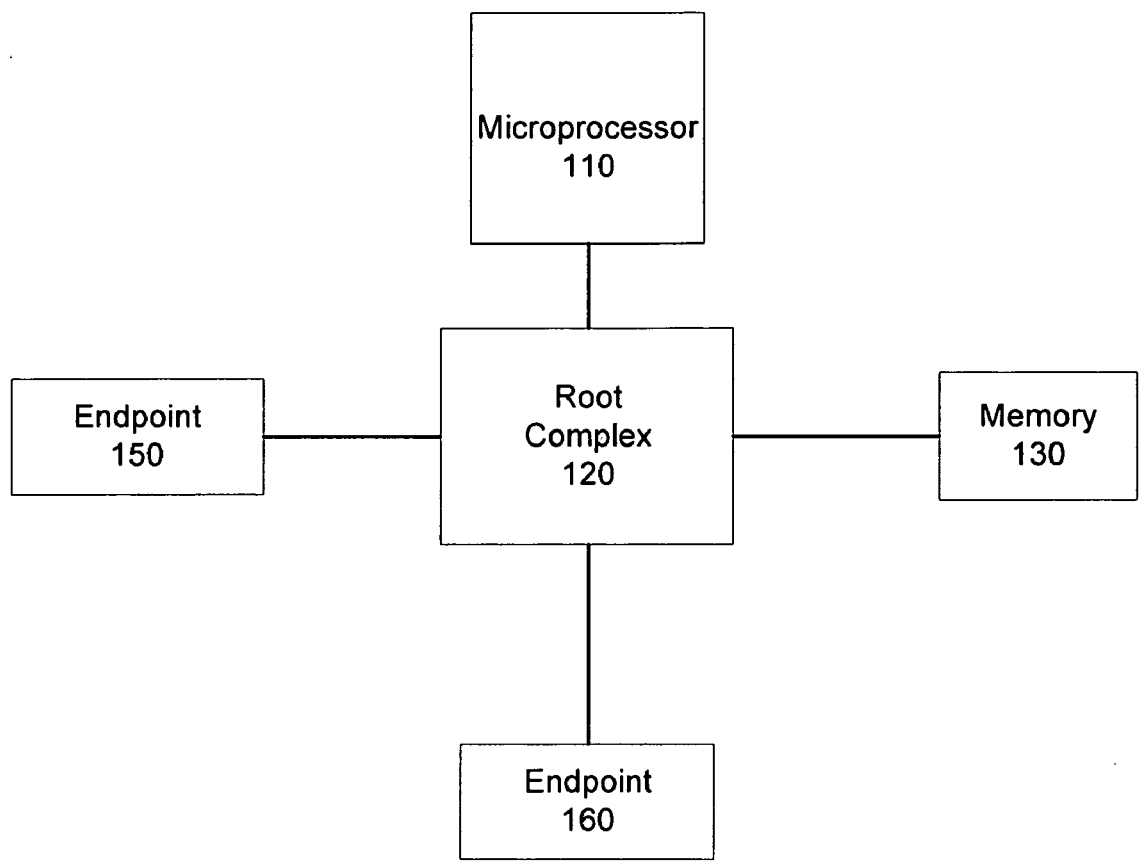
FIG. 1 is a prior art embodiment of a typical hierarchical organization of a computer system.
Figure 2:
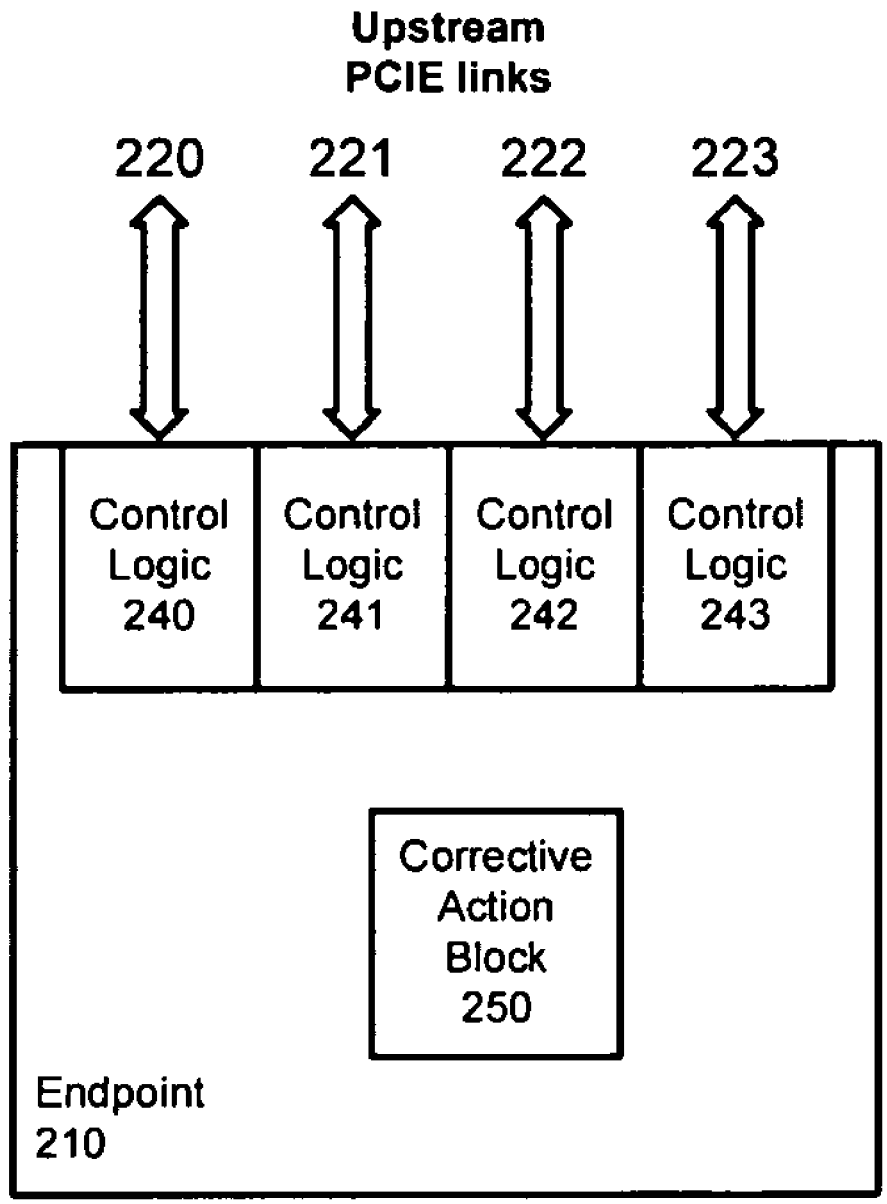
FIG. 2 is a block diagram of an endpoint having control logic according to an embodiment of the invention.

FIG. 2 depicts an endpoint 210 that is coupled to upstream PCIE links 220, 221, 222, and 223. Each link may have one or more lanes, depending on the configuration. Referring to FIG. 2, endpoint 210 has control logic 240 coupled to link 220, control logic 241 coupled to link 221, control logic 242 coupled to link 222, and control logic 243 coupled to link 223. The control logic for each link determines the suitability for use of the lanes within that link.

Figure 3:
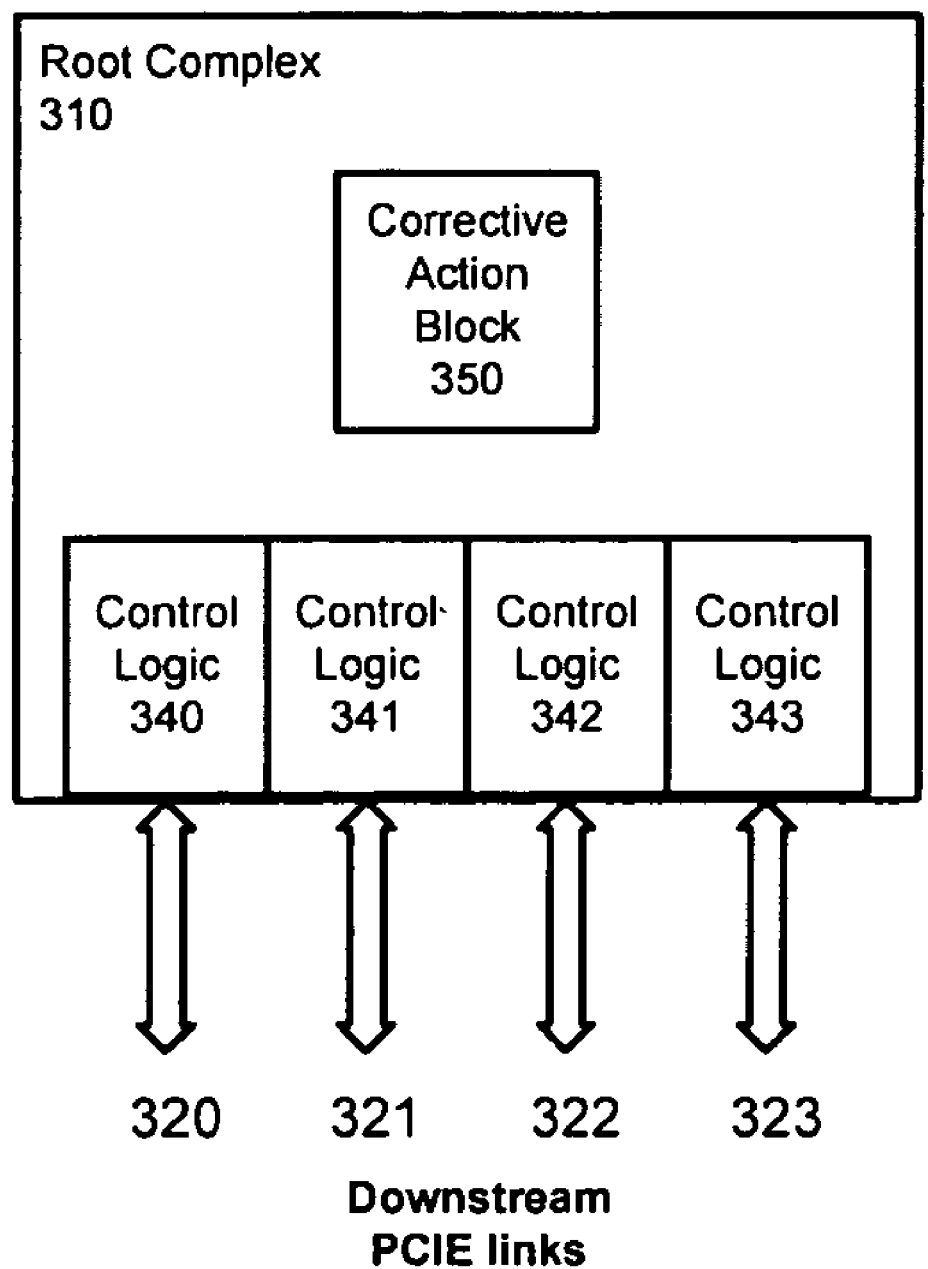
FIG. 3 is a block diagram of a root complex having control logic according to an embodiment of the invention.

FIG. 3 depicts a root complex (RC) 310 that is coupled to downstream PCIE links 320, 321, 322, and 323. Each link may have one or more lanes, depending on the configuration. Referring to FIG. 3, RC 310 has control logic 340 coupled to link 320, control logic 341 coupled to link 321, control logic 342 coupled to link 322, and control logic 343 coupled to link 323. The control logic for each link determines the suitability for use of the lanes within that link.

Each component identifies whether it is capable of supporting this advanced error-tracking feature. It also reports the link widths it is capable of supporting at the various lane positions and its preferred lane assignment along with whether it is capable of reversing the lanes for that width. It also reports whether the current lane assignment has been reversed from its preferred lane assignment. Table 1 illustrates one embodiment of a capability register. In one embodiment, the fields can be assigned as follows.

TABLE 1

Capability Register (read only)

| Field | Bits | Comments |
|---|---|---|
| Predictive_Fault_Capable | 0 | This bit is set to 1 for components that support this advanced feature; otherwise, this bit is set to 0. (reserved) |
| X16_reverse | 1 | This bit indicates whether the component is capable of supporting a x16 link with a reverse lane assignment. |
| X8_capable | 3:2 | Bit 2 indicates whether lanes 0-7 can form a x8 link. Bit 3 indicates whether 8-15 can form a x8 link. |
| X8_rev_capable | 5:4 | Bit 4 indicates whether lanes 7-0 can form a x8 link; this is the reverse lane assignment of bit 2 in the X8_capable field. Bit 5 indicates whether lanes 15-8 can form a x8 link; this is the reverse lane assignment of bit 3 in the X8_capable field. |
| X4_capable | 9:6 | Bits 6, 7, 8, and 9 indicate whether a x4 link can be formed in lanes 0-3, 4-7, 8-11, and 12-15 respectively. |
| X4_rev_capable | 13:10 | Bits 10, 11, 12, and 13 indicate whether a x4 link can be formed in lanes 3-0, 7-4, 11-8, and 15-12 respectively; this is the reverse lane assignment of bits 6, 7, 8, and 9 in the X4_capable field. |
| X2_capable | 21:14 | Bits 14, 15, 16, 17, 18, 19, 20, and 21 indicate whether a x2 link can be formed in lanes 0-1, 2-3, 4-5, 6-7, 8-9, 10-11, 12-13, and 14-15 respectively. |
| X2_rev_capable | 29:22 | Bits 22, 23, 24, 25, 26, 27, 28, and 29 indicate whether a x2 link can be formed in lanes 1-0, 3-2, 5-4, 7-6, 9-8, 11-10, 13-12, and 15-14 respectively; this is the reverse lane assignment of bits 14-21 in the X2_capable field. |
| Lane_reversed | 30 | This bit indicates whether the lanes have been reversed from the preferred assignment and this is the only bit that changes after the system is powered on. |

In an alternate embodiment, the information from Table 1 can be provided explicitly to software by the component. If the component does not have this advanced error-tracking feature, the information can be provided to software in the form of a table from the device ID. Since the device capability does not change, the characteristic of the device remains unchanged. The lane_reversed field can be inferred by knowing the board layout.

In addition to the error log information provided by the PCIE Specification, each component has the following error log information. Table 2 illustrates one embodiment of an error log register to track receiver errors (Rcvr_error), a CRC error, and error correction messages (ERR_COR) for a x16 link. In one embodiment, receiver errors are logged on a per lane basis in the LTSSM states in which they are supposed to be logged. In one embodiment, a CRC error is logged when a TLP or DLLP did not report any receiver errors in any of the constituent lanes, but the CRC failed. In one embodiment, for a Root Complex (RC), any error correction messages received are also logged. This helps to identify if other components (e.g. endpoints) are experiencing correctable errors if the other components do not have this advanced feature implemented. In one embodiment, the fields can be assigned as follows.

TABLE 2

Error Log Register (RW1C)

| Field | Bits | Comments |
|---|---|---|
| Rcvr_error | 15:0 | These bits log receiver errors in the corresponding lane. |
| CRC error | 16 | This bit logs DLLP/TLP CRC errors. |

TABLE 2-continued

Error Log Register (RW1C)

| Field | Bits | Comments |
|---|---|---|
| ERR_COR | 17 | Applicable for Root Complex only. This bit logs error correction messages. |

In addition to the above error log, the component has control logic to report if the error rate is above a certain threshold. The goal is not to report an average bit error rate (BER) blindly as the total number of bit errors over time, but rather something meaningful in terms of the impact on the recovery action initiated. This technique eliminates counting of multiple errors on the same lane that are correlated. For example, a bit slip may cause several bit errors back to back in a window of time that could artificially skew the BER to a high number. Similarly, an external noise event can cause a high BER temporarily, but should not cause the component to eliminate that lane and reduce the effective bandwidth. Instead, this technique tracks if an error incident occurred over a programmable time period and checks if there are consistent errors over multiple consecutive time windows, which is also a programmable number.

In one embodiment, this technique may be implemented with a two-level error counter. The first level of the error counter defines windows of time which are programmable (e.g., aggregate_error_time defined in Table 3 below). This is the time period over which error checking occurs for the categories of errors listed in Table 2. The error check occurs only in the LTSSM states where the PCIE Specification requires receiver errors (e.g., Config, L0) and CRC/ERR- _COR (e.g., L0 state) to be logged. As an example, suppose the time period is programmed to be 10 μseconds. Then a counter with a 10-μsecond interval would start anytime error logging is enabled. The receiver errors per lane, the CRC error, and the ERR_COR message are tracked in individual flops (e.g., error_event). As an example, suppose the link has 8 lanes. In this embodiment, 8 flops are needed for the individual receiver errors, 1 flop for the CRC error, and 1 flop for the ERR_COR message (assuming this is the RC). Thus, a total of 10 flops is needed to track the various error events. If any of the error events occur, the corresponding flop is set. Each of these flops is cleared at the end of the 10-μsecond time period. At the end of each time period, before the flop is cleared and if the flop is set, a counter is incremented. This error_count counter is a Control Status Register (CSR) observable counter and tracks how many aggregated error events have occurred so far. In this embodiment, the number of counters equals the total number of error events; there is one for the receiver error for each lane, one for the CRC error, and one for the error correction message. Thus, in this example of a x8 link that is also the RC, 10 counters are needed. The width of the counter can be any implementation-specific number, depending on how much history the user would like to track and how much threshold the user desires.

Figure 4:
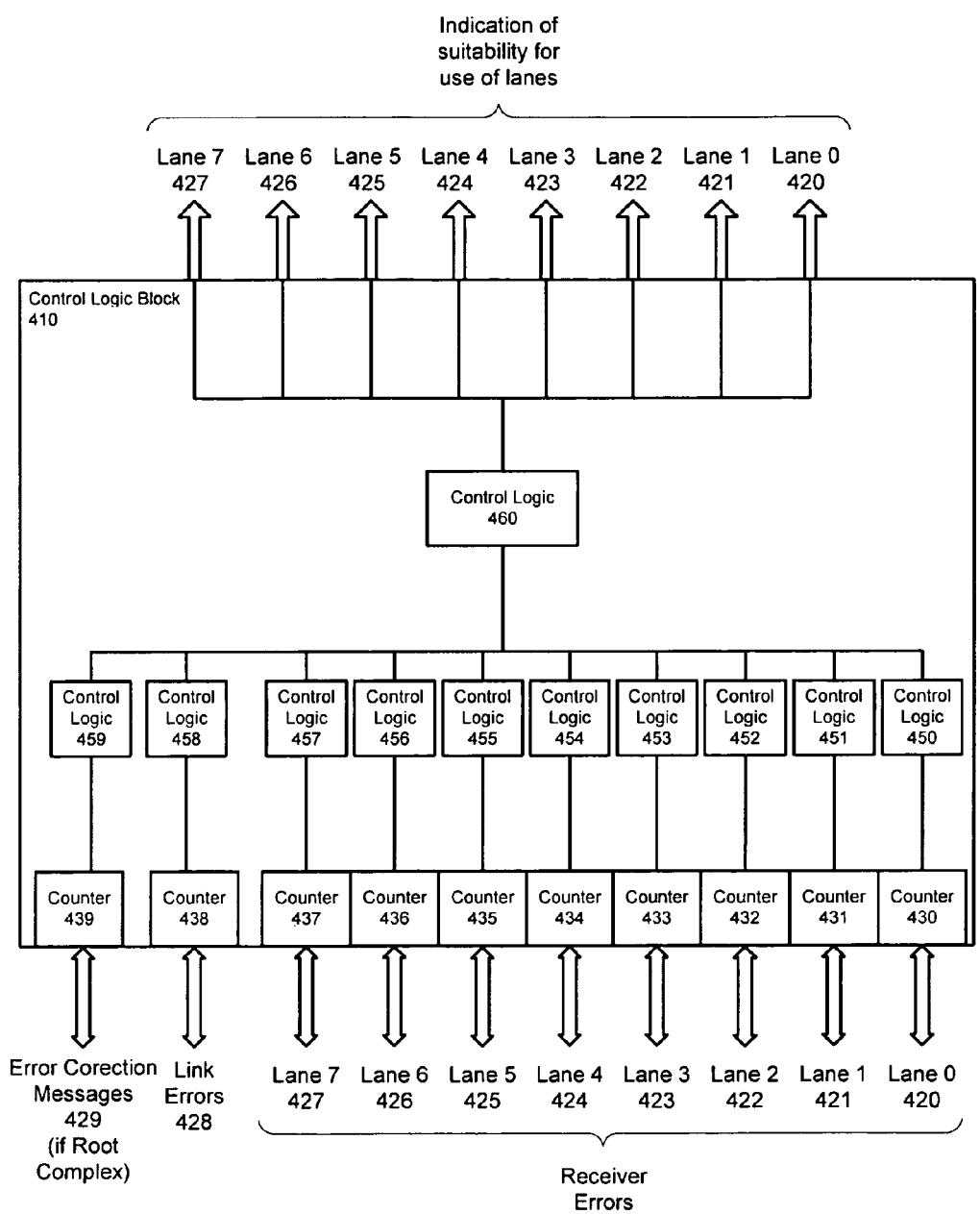
FIG. 4 is a block diagram of a control logic block according to an embodiment of the invention.

FIG. 4 is a block diagram of a control logic block according to an embodiment of the invention. FIG. 4 uses the example of a control logic block in the RC coupled to a x8 link. Control logic block 410 receives receiver errors 420-427 for lane 0 through lane 7 respectively, link errors 428, and error correction messages 429. Counters 430-437 track the number of aggregated error events that have occurred so far in lane 0 through lane 7 respectively. Counter 438 tracks the number of aggregated CRC error events. Counter 439 tracks the number of aggregated error correction messages. Control logic 450 sets a prolonged_error bit if the error_count is greater than or equal to a programmable threshold for receiver errors for lane 0. Similarly, control logic 451, 452, 453, 454, 455, 456, and 457 set a prolonged_error bit if the error_count is greater than or equal to a programmable threshold for receiver errors for lane 1, lane 2, lane 3, lane 4, lane 5, lane 6, and lane 7 respectively. Likewise, control logic 458 sets a prolonged_error bit if the error_count is greater than or equal to a programmable threshold for CRC errors and control logic 459 sets a prolonged_error bit if the error_count is greater than or equal to a programmable threshold for error correction messages. Depending on the user's preference for how much weight to assign to each of these errors, control logic 460 generates an indication of suitability for use of the various lanes.

Although FIG. 4 shows one embodiment of an implementation employing the techniques described herein, these techniques are not restricted to this example. Note that FIG. 4 uses a x8 PCIE link as an example; however, any arbitrary size of standard PCIE bus (x1, x2, x4, x8, x12, or x16) may be used.

Control Status Registers (CSRs) can control and track the various elements of this technique. Table 3 illustrates the CSRs that may be used and in one embodiment, the fields may be assigned as follows.

TABLE 3

Control Status Registers

| Field | Bits | Type | Comments |
| --- | --- | --- | --- |
| Aggregate_error_time | [19:0] | RWST | Number of cycles over which each error type is counted at most once. In one embodiment, this can be done with an error_event register which is cleared when the time expires. |
| Expected_ber | [49:0] | RWST | Number of cycles over which an error of each type is expected. |
| Error_count | [89:0] | RW1CST | Bits [79:0] represent the count of receiver (e.g., 8b/10b) errors for each of the lanes. Bits [84:80] represent the count of CRC errors. Bits [89:85] represent the count of ERR_COR messages received if the RC. Each error counter is 5 bits. This counter is incremented when error_event is 1 and the timeout in aggregate_error_time expires. This counter is decremented by 1 when another counter that repeats every expected_ber cycles expires. |
| Error_threshold | [14:0] | RWST | The threshold for errors of each type in error_count. Bits [4:0] are for receiver errors. Bits [9:5] are for CRC errors. Bits [14:10] are for ERR_COR messages. The prolonged_error bits are set if the error_count is greater than or equal to the error_threshold. |
| Prolonged_error | [17:0] | RW1CST | Bits [15:0] represent the receiver error in each lane. Bit 16 represents the CRC errors. Bit 17 represents the ERR_COR messages (if RC). Hardware can clear these bits when corrective action is taken. |

TABLE 3-continued

Control Status Registers

| Field | Bits | Type | Comments |
| --- | --- | --- | --- |
| Higher_speed_prolonged_error | [17:0] | RW1CST | These bits are set when prolonged_error is set and hardware downgrades the frequency to correct the error. This can also be done by software if corrective action is taken by software. |
| Mask_lane | [15:0] | RWST | These bits are set by software to eliminate lanes from link training. Software will write this mask and then signal link retraining CSRs so the LTSSM enters Config from Recovery. The bits that are set mask out the corresponding lane during Config and results in a degraded link. |
| Link_up_detect | 0 | RW1CST | Link_down does not happen even when the LTSSM goes to the Detect state, provided the Polling state is reached in less than 100 ms. |

The error_count counter is incremented by the error_event flop whenever the aggregate_error_time counter rolls over. The counter is decremented by another counter (expected_error_counter) which is controlled by a CSR (expected_ber) that represents an error rate (on an average of one error in a time period) the user is willing to tolerate. For example, a reasonable error rate per lane is one error every 30 minutes. Then the counter may be programmed by a number corresponding to 30 minutes and every 30 minutes, each error_count counter would be decremented by 1 if it is non-zero. The error_count counter is incremented in every programmable time period there is an error_event and the counter is decremented by 1 every time the expected error time period is crossed. Thus, any number in the error_count register represents the excessive errors there have been over the time window it has been active. The only exception to this rule is if the error_count is 1, since there may not be another error_event until the expected_error_counter pops. If the error_count exceeds a user-defined threshold (error_threshold CSR in Table 3), the prolonged_error CSR is set which then causes corrective action to be taken. In one embodiment, corrective action may be taken by corrective action block 250 in FIG. 2. In another embodiment, corrective action may be taken by corrective action block 350 in FIG. 3.

FIG. 5 is a flow chart for an aggregate counter according to an embodiment of the invention. The aggregate counter tracks the time over which each error type is counted at most once. Every clock cycle, the aggregate counter is incremented until the aggregate counter is greater than or equal to the aggregate_error_time CSR. Then the aggregate counter is reset to 0 and starts again. FIG. 6 is a flow chart for the error_event according to an embodiment of the invention. The receiver errors per lane, the CRC error, and the ERR_COR messages are tracked in individual error_event flops. If an error occurs, the error_event flop for the corresponding error is set to 1. When the aggregate counter time expires and is reset to 0, the error_event is also reset to 0. FIG. 7 is a flow chart for the expected error counter according to an embodiment of the invention. The expected error counter tracks the time over which one error is expected. Every clock cycle, the expected error counter is incremented until the expected error counter is greater than or equal to the expected_ber CSR. Then the expected error counter is reset to 0 and starts again. FIG. 8 is a flow chart for the error_count according to an embodiment of the invention. The receiver errors per lane, the CRC error, and the ERR_COR messages are tracked in individual error_count counters. Each error_count starts at 0. If the error_event is 1 and the aggregate counter expires, the error_count is incremented. If the expected error counter expires, the error_count is decremented. If the error_count is greater than or equal to the error_threshold, the prolonged_error bit is set.

As an example, consider the x8 link discussed above with a 30-minute expected_ber, where the error_threshold is programmed to be 9, and the following sequence of events. Suppose the error_count in lane 6 is 4 in the first 30-minute interval. Then, at the end of the first 30-minute interval when the expected error counter expires, error_count is decremented and becomes 3. Over the next 30 minutes, error_event is reported twice. Then, at the end of the next 30-minute interval (60 minutes from the start), the error_count is 4 (3+2−1). Suppose over the next 30-minute interval, error_event is reported 5 times. Then, some time during the third 30-minute interval (less than 90 minutes from the start), the error_count for lane 6 is 9. Since the error_threshold is 9 and the error_count is also 9, the prolonged_error bit for lane 6 is set. In one embodiment, hardware can take corrective action to remove lane 6 after going through the Recovery state. In an alternate embodiment, the error can be reported to software and software may program a mask register (mask_lane CSR from Table 3) and signal the link_retrain CSR defined by the PCIE protocol that will remove lane 6 from the link negotiation.

An error recovery action may be initiated by hardware or software. In one embodiment, the component may first attempt to reduce the frequency if the speed of operation is greater than Gen 1. If this is done by hardware, the hardware remembers that it initiated a speed degradation, clears the prolonged_error CSR bit but stores the problem in the higher_speed_prolonged_error CSR bit. In an alternative embodiment, software clears the bit if the recovery is initiated by software but stores the information that the link had issues at a higher speed. This bit remains set for a time period longer than what it takes to infer a prolonged_error. If error_count remains low throughout this time period, then the higher_ speed_prolonged_error CSR may be reset. Another option is to upgrade the speed and assess if the same issue persists. If the error persists and occurs in the same lane, the link training would be reinitiated without the faulty lane.

As an example, suppose lane 6 was eliminated in a x8 link since it was error prone and the link is operating as a x4 in a degraded mode. Then, if lane 0 becomes error prone, and assuming both sides do not support a x2 in lanes 2 and 3, the link could only operate in lane 7. Since lanes 4-7 have been left out in the Config state, it is not possible to reclaim the lanes without going through the Detect state, which will cause the downstream component to be reset. In that case, software can set the link_up_detect bit, set the mask_lane bits with the faulty lanes and then signal the link retrain bit. The LTSSM goes to the Recovery state, finds that it cannot form a link with the set of remaining operating lanes (in this example, lanes 4-7), the masked out lane (in this example, lane 0 is removed), and the capability of the LTSSM on both sides, so it goes back to the Detect state. Since the link_up_detect is set, the link_up is asserted and the LTSSM moves to Polling and Config and links up (in this example, as a x1 link on lane 7).

ADDITIONAL INFORMATION AND EMBODIMENTS

There may be a variety of circuits in the components which are not illustrated in the figures. When the figures show two blocks connected through conductors, there may be intermediate circuitry that is not illustrated. The shape and relative sizes of the blocks is not intended to relate to actual shapes and relative sizes.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B."

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element. If the specification or claims refer to "an additional" element, that does not preclude there being more than one of the additional element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. An integrated circuit for coupling to a link having a plurality of lanes comprising:
   a first counter to count errors for one of a plurality of lanes in the link and to filter a first count based on a first programmable time period and a first programmable expected error rate;
   a second counter to count errors for the link and to filter a second count based on a second programmable time period and a second programmable expected error rate;
   a first control logic to generate an indication of a first prolonged error for the one of a plurality of lanes in the link based on the first count and a first programmable threshold; and
   a second control logic to generate an indication of a second prolonged error for the link based on the second count and a second programmable threshold.

2. The integrated circuit of claim 1, further comprising a third control logic to generate an indication of the suitability for use of the lane based on the first prolonged error and the second prolonged error.

3. The integrated circuit of claim 1, wherein the first counter counts receiver errors.

4. The integrated circuit of claim 1, wherein the second counter counts Cyclical Redundancy Checking (CRC) errors.

5. The integrated circuit of claim 1, wherein the first programmable time period is the time period over which multiple errors on the one of a plurality of lanes are counted as a single error.

6. The integrated circuit of claim 1, wherein the second programmable time period is the time period over which multiple errors on the link are counted as a single error.

7. The integrated circuit of claim 1, wherein the first programmable time period and the second programmable time period are the same.

8. The integrated circuit of claim 1, wherein the first programmable threshold and the second programmable threshold are the acceptable error counts for the first count and the second count accordingly.

9. The integrated circuit of claim 1, further comprising:
   a third counter to count error correction messages received by a component from one or more endpoints and to filter a third count based on a third programmable time period and a third programmable expected error rate; and
   a third control logic to generate an indication of a third prolonged error for the error correction messages received by the component based on the third count and a third programmable threshold.

10. The integrated circuit of claim 9, further comprising a fourth control logic to generate an indication of the suitability for use of the lane based on the first prolonged error, the second prolonged error, and the third prolonged error.

11. A method comprising:
    counting errors for one of a plurality of lanes in a link and filtering the lane error count based on a first programmable time period and a first programmable expected error rate;
    counting errors for the link and filtering the link error count based on a second programmable time period and a second programmable expected error rate;
    indicating a first prolonged error for the one of a plurality of lanes in the link based on the first count and a first programmable threshold; and
    indicating a second prolonged error for the link based on the second count and a second programmable threshold.

12. The method of claim 11, further comprising indicating the suitability for use of the lane based on the first prolonged error and the second prolonged error.

13. The method of claim 11, further comprising:
counting error correction messages from one or more endpoints coupled to a component and filtering the error correction count based on a third programmable time period and a third programmable expected error rate; and
indicating a third prolonged error for the error correction messages received by the component based on the third count and a third programmable threshold.

14. The method of claim 13, further comprising indicating the suitability for use of the lane based on the first prolonged error, the second prolonged error, and the third prolonged error.

15. The method of claim 11, further comprising taking error recovery action if the lane is not suitable.

16. The method of claim 15, wherein hardware initiates the error recovery action.

17. The method of claim 15, wherein software initiates the error recovery action.

* * * * *